(12) United States Patent  (10) Patent No.: US 7,092,624 B2
Perry et al.  (45) Date of Patent: Aug. 15, 2006

(54) CAMERA WITH COLD NEON DISPLAY AREAS

(75) Inventors: Jerry W. Perry, 38 Corners Rd., Congers, NY (US) 10920; Ivan Lau, Kowloon (HK)

(73) Assignee: Jerry W. Perry, Congress, NY (US)

( * ) Notice: Subject to any disclaimer, the term of this patent is extended or adjusted under 35 U.S.C. 154(b) by 0 days.

(21) Appl. No.: 10/847,076

(22) Filed: May 17, 2004

(65) Prior Publication Data

US 2005/0254816 A1    Nov. 17, 2005

(51) Int. Cl.
   *G03B 17/02* (2006.01)
   *G03B 17/18* (2006.01)

(52) U.S. Cl. .................... 396/6; 396/201; 396/287; 396/535

(58) Field of Classification Search .............. 396/6, 396/201, 205, 206, 281, 287, 429, 535
   See application file for complete search history.

(56) References Cited

U.S. PATENT DOCUMENTS

| 4,072,973 | A | * | 2/1978 | Mayo | 396/544 |
|---|---|---|---|---|---|
| 4,833,495 | A | | 5/1989 | Ohmura et al. | |
| 4,855,774 | A | | 8/1989 | Ohmura et al. | |
| 4,884,087 | A | | 11/1989 | Mochida et al. | |
| 4,954,857 | A | | 9/1990 | Mochida et al. | |
| 4,972,649 | A | | 11/1990 | Mochida et al. | |
| RE34,168 | E | | 1/1993 | Ohmura et al. | |
| 5,235,364 | A | | 8/1993 | Ohmura et al. | |
| RE345,750 | | | 4/1994 | Arai | |
| 5,361,111 | A | | 11/1994 | Yamashina et al. | |
| 5,381,200 | A | | 1/1995 | Takagai | |
| 5,408,288 | A | | 4/1995 | Ogura et al. | |
| 5,436,685 | A | | 7/1995 | Yamashina | |
| D372,722 | S | | 8/1996 | Isozaki | |
| 5,649,244 | A | * | 7/1997 | Sato et al. | 396/287 |
| 5,946,507 | A | * | 8/1999 | Akami et al. | 396/287 |
| 6,442,348 | B1 | | 8/2002 | Yamada | |
| 6,535,695 | B1 | * | 3/2003 | Miyamoto | 396/287 |
| 6,704,506 | B1 | * | 3/2004 | Sasagawa | 396/88 |

* cited by examiner

*Primary Examiner*—Christopher Mahoney
(74) *Attorney, Agent, or Firm*—Wallenstein & Wagner, Ltd.

(57) ABSTRACT

The methods and apparatus described herein provide a camera (or other electronic equipment) with one or more cold neon display areas. Each cold neon display area is illuminated by a neon powder layer electrically connected to a substrate layer via a power source. Each cold neon display area produces the effect of glowing words and/or images that are shaped by one or more mask layers and colored by one or more filter layers. In addition, the plane that each cold neon display area appears at may vary to create a three dimensional lighting effect.

18 Claims, 4 Drawing Sheets

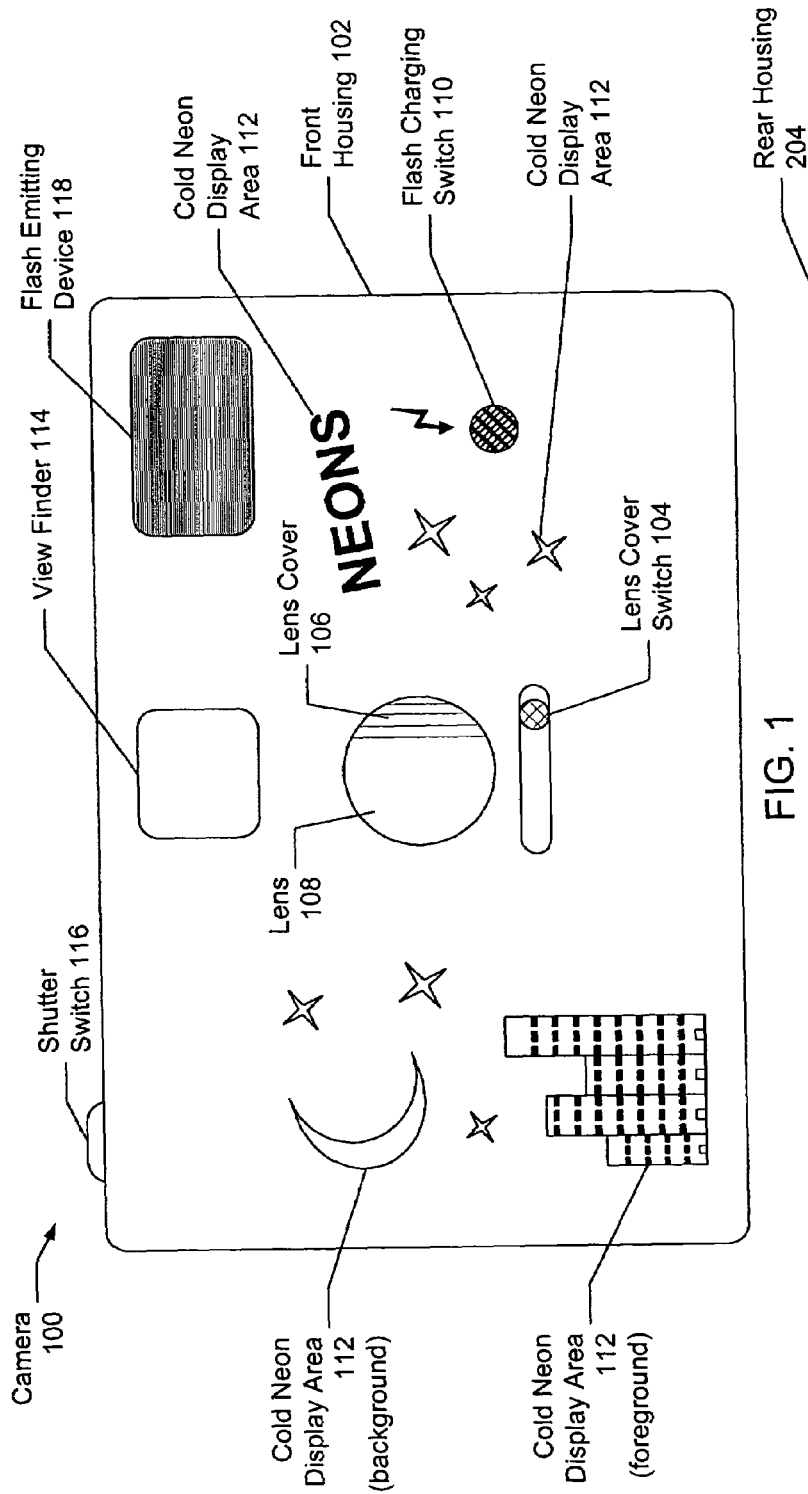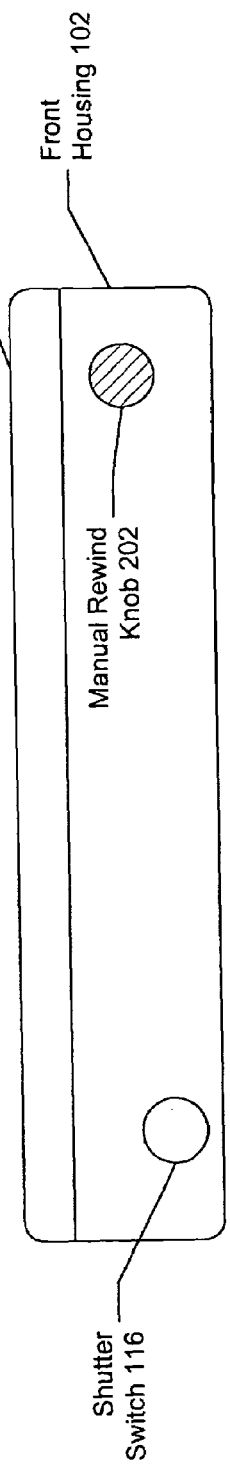
FIG. 1
FIG. 2

CAMERA WITH COLD NEON DISPLAY AREAS

TECHNICAL FIELD

The present application relates in general to consumer electronic equipment and, in particular, to a camera with one or more cold neon display areas.

BACKGROUND

Often, a consumer electronic device is a fashion statement in addition to being a functional device. For example, many cellular telephones allow the user to set a personal ring tone in order to avoid confusing the ring with another cellular telephones ring as well as to make a personality statement. Similarly, many electronic devices, such as digital music players and cameras, come in multiple colors in order to satisfy the urge consumers have to be different and stylish. However, current methods used to distinguish consumer electronic devices (e.g., color, flashing lights, etc.) are so common that these methods are beginning to look alike, thereby failing to distinguish one device from another.

In addition, for camera users, a problem exists in obtaining the attention of the subject of the photograph. This is especially true with at least animals and children. Accordingly, some cameras may include a plurality of flashing lights in order to attract the attention of the subject. However, flashing lights can be distracting to other people.

BRIEF DESCRIPTION OF THE DRAWINGS

FIG. 1 is a front view of an example camera.
FIG. 2 is a top view of the example camera of FIG. 1.

DETAILED DESCRIPTION

Figure 3:
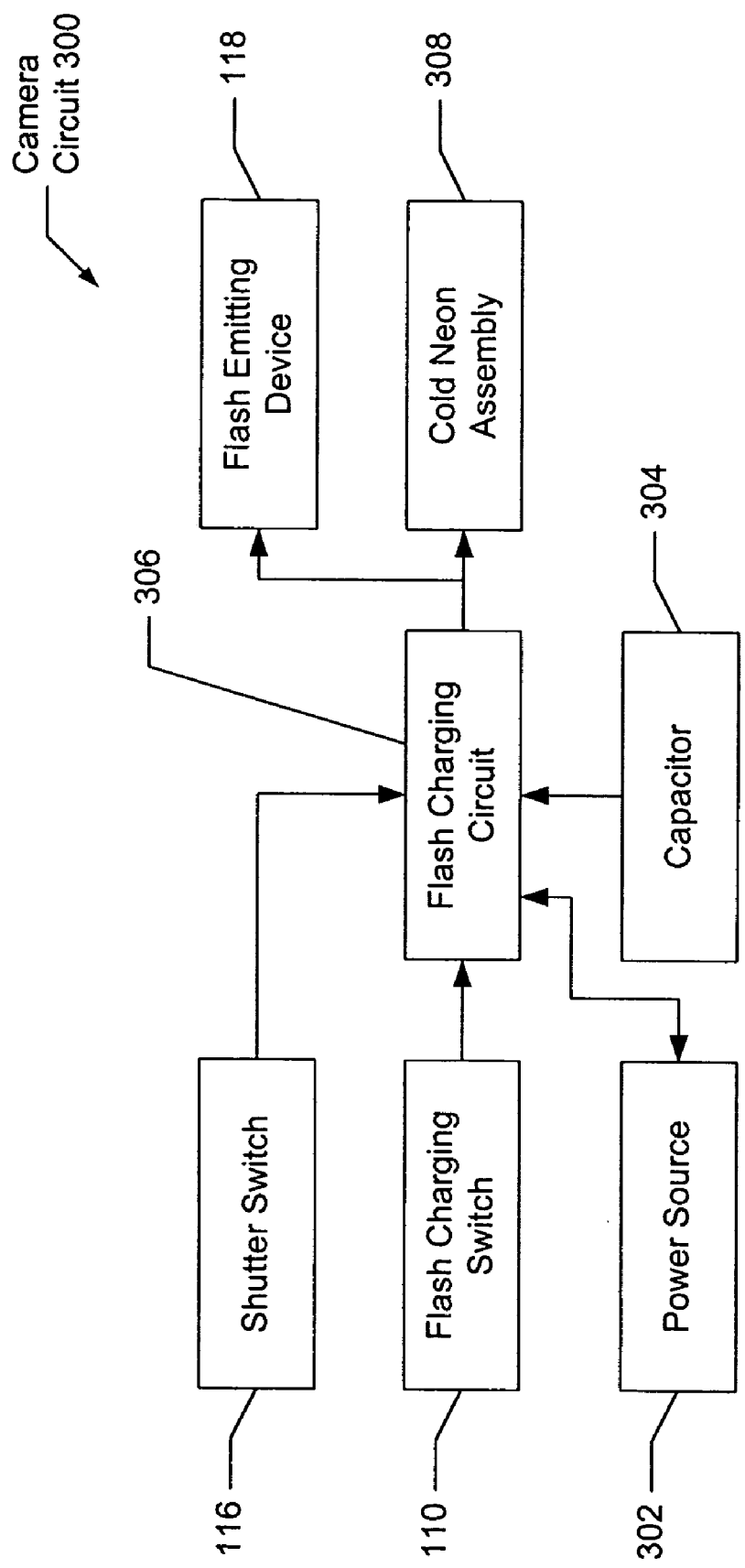
FIG. 3 is a block diagram of an example camera circuit.

In general, the methods and apparatus described herein provide a camera with one or more cold neon display areas. Each cold neon display area is illuminated by a neon powder layer electrically connected to a substrate layer via a power source. Each cold neon display area produces the effect of glowing words and/or images that are shaped by one or more mask layers and colored by one or more filter layers. In addition, the plane at which each cold neon display area appears may vary to create a three dimensional lighting effect.

A front view of an example camera 100 is illustrated in FIG. 1. Although a camera is used in the examples herein, a person of ordinary skill in the art will readily appreciate that the techniques described herein may be applied to any type of electronic equipment. For example, cellular telephones, personal digital assistants, digital music players, etc. may include cold neon display areas as described here.

In the example illustrated in FIG. 1, the camera 100 includes a front housing 102, a lens cover switch 104, a lens cover 106, a lens 108, a flash-charging switch 110, a plurality of cold neon display areas 112, a viewfinder 114, a shutter switch 116, and a flash-emitting device 118. A top view of the example camera 100 is illustrated in FIG. 2. In this view, a manual rewind knob 202 and a rear housing 204 are also shown.

In operation, the user typically begins by sliding the lens cover switch 104 to open the lens cover 106. Subsequently, the user presses the flash-charging switch 110 in order to charge a capacitor 304 as described below. In addition, pressing the flash-charging switch 110 preferably illuminates the plurality of cold neon display areas 112 as described below. After framing the subject of a photograph through the optical viewfinder 114, the user presses the shutter switch 116 to activate the flash-emitting device 118 and take the picture. Preferably, the plurality of cold neon display areas 112 are turned off in response to the picture being taken. When a roll of film is exhausted, the user may rewind the roll using the manual rewind knob 202 and remove the film by opening the rear housing 204.

A block diagram of an example camera circuit 300 is illustrated in FIG. 3. In this example, the camera circuit 300 includes a power source 302, a capacitor 304, a flash-charging circuit 306, and a cold neon assembly 308 electrically connected to the flash-charging switch 110, the shutter switch 116, and the flash-emitting device 118 of FIG. 1.

In operation, the power source 302 supplies electrical current to the capacitor 304 via the flash-charging circuit 306 when the flash-charging switch 110 is pressed. In this manner, the capacitor 304 may supply a higher voltage and/or current to the flash-emitting device 118 than could be supplied directly from the power source 302 (e.g., batteries). When the shutter switch 116 is pressed, the capacitor 304 discharges into the flash-emitting device 118 producing a sudden burst of light to illuminate a subject. Subsequently, the power source 302 supplies additional electrical current to the capacitor 304 via the flash-charging circuit 306 either automatically or upon a subsequent depression of the flash-charging switch 110.

In addition, the power source 302 and/or the capacitor 304 supply electrical current to the cold neon assembly 308 via the flash-charging circuit 306 when the flash-charging switch 110 is pressed. Preferably, the flash-charging circuit 306 conditions the electrical current supplied from the capacitor 304 to the cold neon assembly 308. For example, the flash-charging circuit 306 may supply the cold neon assembly 308 with 256 volts at 10 kilohertz. When the capacitor 304 is supplying electrical current to the cold neon assembly 308, the cold neon assembly 308 "glows" to produce words and images as described below. When the shutter switch 116 is pressed, the capacitor 304 discharges and the cold neon assembly 308 turns off until the power source 302 supplies additional electrical current to the capacitor 304.

If the shutter switch 116 is not pressed within a predetermined time period after the flash-charging switch 110 is pressed, the flash-charging circuit 306 causes the energy stored in the capacitor 304 to be discharged back into the power source 302. In addition, the flash-charging circuit 306 stops supplying electrical current to the cold neon assembly 308 in order to conserve the power source 302 energy. For example, the capacitor 304 may be charged and the cold neon assembly 308 may be illuminated for approximately 90–120 seconds after the flash-charging switch 110 is pressed. After the 90–120 seconds, the capacitor 304 is discharged and the cold neon assembly 308 turns off.

Figure 4:
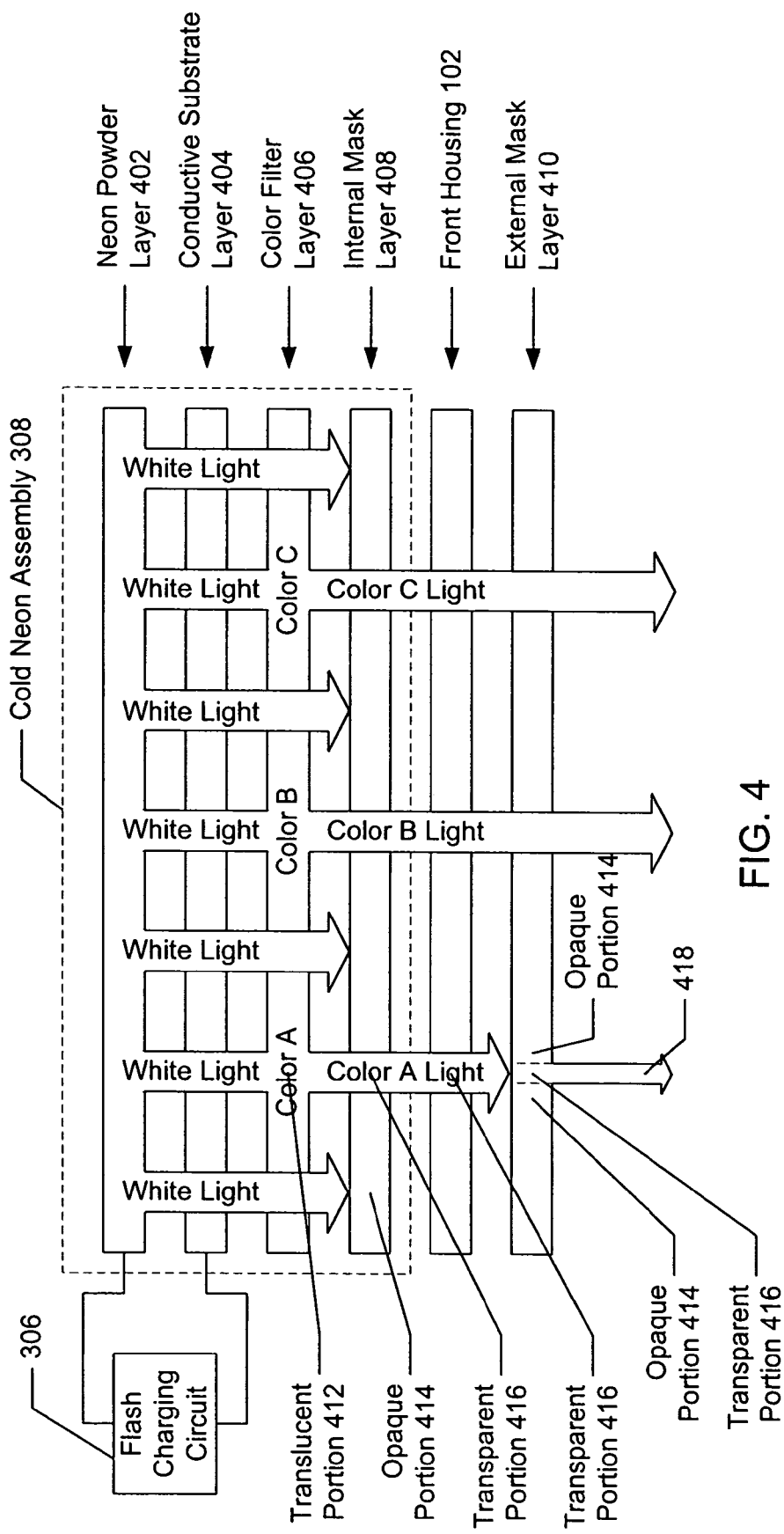
FIG. 4 is a block diagram of an example cold neon assembly.

A block diagram of an example cold neon assembly 308 is illustrated in FIG. 4. In this example, the cold neon assembly 308 includes a neon powder layer 402, a conductive substrate layer 404, a color filter layer 406, and an internal mask layer 408. In addition, the cold neon assembly 308 may include an external mask layer 410. Preferably, the conductive substrate layer 404 is transparent. The color filter layer 406 may include any number of translucent portions 412 of different colors. Similarly, the color filter layer 406 may include a separate sub-layer for each color. For example, a silk screening process may be used for each color represented by the color filter layer 406. The internal mask layer 408 and the external mask layer 410 preferably include opaque portions 414 and transparent portions 416. The front housing 102 also includes one or more transparent portions 416. For example, the front housing 102 may be entirely made from transparent PVC material, or the front housing 102 may include windows. As shown, the transparent portions 416 of the mask layer(s) and the front housing 102 are substantially aligned with each other and the translucent portions 412 of the color filter layer 406.

In operation, the flash charging circuit 306 energizes the neon powder layer 402. As a result, the neon powder layer 402 emits energy in the form of visible light. This "white" light passes through the conductive substrate layer 404, because the substrate layer 404 is transparent. One or more color filter layers 406 then filter the white light in order to remove certain electromagnetic frequencies thereby producing colored light. A portion of the colored light strikes the opaque portions 414 of the internal mask layer 408 and is dissipated as reflected light and absorbed heat. Another portion of the colored light passes through the transparent portions 416 of the internal mask layer 408 and the front housing 102. The light that reaches the outside of the front housing 102 produces the effect of glowing words and images shaped by the internal mask layer 408 and colored by the color filter layer 406.

In addition, the external mask layer 410 may further shape a portion 418 of the light that reaches the outside of the front housing 102. In this manner, light that is shaped by the external mask layer 410 appears to the user to exist at the plane of the external mask layer 410. Conversely, light that is shaped only by the internal mask layer 408 appears to the user to exist at the plane of the internal mask layer 408. As a result, a camera (or other product) employing both techniques is able to produce a 3D effect. For example, the lights of a building in the "foreground" may be produced using a yellow filter layer and an external mask layer in the shape of a building with transparent portions for the windows, and the light of a moon in the "background" may be produced using a light blue filter layer and an internal mask layer with a transparent portion in the shape of a moon.

Figure 5:
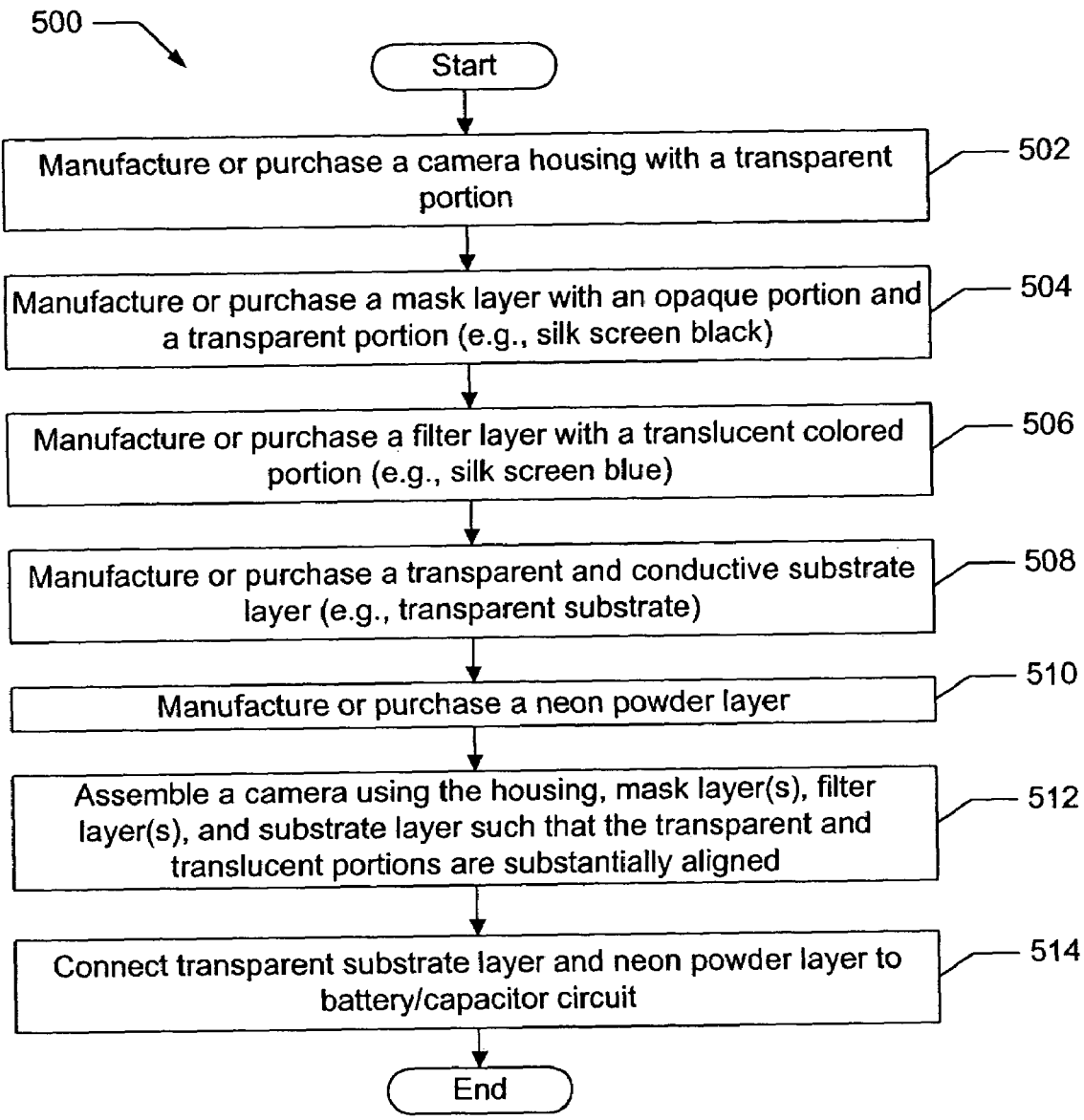
FIG. 5 is an example process for manufacturing a camera with a cold neon display area.

An example process 500 for manufacturing a camera 100 with cold neon display areas 112 is illustrated in FIG. 5. In general, the process 500 provides for the assembly of a plurality of layers (including a neon powder layer, a conductive substrate layer, one or more color filter layers, one or more mask layers, and a housing) such that transparent and translucent portions of the layers align to create one or more cold neon display areas 112. Although the process 500 is described with reference to the flowchart illustrated in FIG. 5, a person of ordinary skill in the art will readily appreciate that many other methods of performing the acts associated with process 500 may be used. For example, the order of many of the steps may be changed. In addition, many of the steps described are optional.

In the example illustrated in FIG. 5, a camera housing 102 with a transparent portion 416 is manufactured or purchased (block 502). For example, a clear camera housing may be manufactured via injection molding using a clear PVC material. In addition, one or more mask layers 408, 410 with opaque portions 414 and transparent portions 416 are manufactured or purchased (block 504). For example, a black silk-screening process may be used to produce a mask layer 408 with transparent portions 416 representing words and or symbols for display in one or more cold neon display areas 112. One or more color filter layers 406 are also manufactured or purchased (block 506). For example, one or more color silk-screening processes may be used to produce one or more color filter layers 406. In addition, a conductive substrate layer 404 is manufactured or purchased (block 508). Preferably, the conductive substrate layer 404 is transparent. A neon powder layer 402 is also manufactured or purchased (block 510). Preferably, the neon powder layer 402 is a "cold neon" type of powder capable of emitting light in response to an electrical current.

Once each of the layers is manufactured and/or purchased, the camera is assembled (block 512). Preferably, the conductive substrate layer 402 is positioned on top of the neon powder layer 402. Preferably, the conductive substrate layer 402 is transparent. However, if the conductive substrate layer 402 is not transparent, the neon powder layer 402 is preferably placed on top of the conductive substrate layer 402. Alternatively, the conductive substrate layer 402 may include one or more transparent portions 416 (e.g., windows). In such an instance, the conductive substrate layer 402 may be positioned on top of the neon powder layer 402.

Next, one or more color filter layers 406 are placed on top of the conductive substrate layer 404 (or on top of the neon powder layer 402 if the conductive substrate layer 404 is below the neon powder layer 402). For example, a first cold neon display area 112 may appear as the word "Neons" in a blue color. In such an instance, a blue filter layer 406 is placed in alignment with the first cold neon display area 112. Similarly, a second cold neon display area 112 may appear as a building with lighted windows in a yellow color. In such an instance, a yellow filter layer 406 is placed in alignment with the second cold neon display area 112.

Next, an internal mask layer 408 may be placed on top of the color filter layers 406. Continuing with the above example, a black mask with a "cutout" (i.e., transparent portion) for the word "Neons" may be placed in alignment with the blue portion of the filter layer(s) 406.

The entire assembly is then placed in the front housing 102. If the front housing 102 is not transparent, one or more transparent portions of the front housing 102 are preferably aligned with the transparent portion(s) of the internal mask layer 408. In this manner, the cold neon display areas 112 constructed inside the camera housing are visible front outside the camera housing 102.

In addition, one or more external mask layers 410 may be affixed to the camera housing 102. For example, the second cold neon display area 112 described in the example above may be produced by silk screening a black building with transparent windows on the outside surface of the front housing 102 in alignment with the yellow filter layer 406.

Once the layers are assembled, the neon powder layer 402 is connected to one terminal (e.g., a positive terminal) of the flash charging circuit 306, and the conductive substrate layer 404 is connected to another terminal (e.g., a negative terminal) of the flash charging circuit 306 (block 514). When the flash charging circuit 306 supplies current to the neon powder layer 402 (e.g., 256 V at 10 kHz), the neon powder layer 402 emits light. The emitted lighted is then colored by the filter layer(s) 406 and shaped by the mask layer(s) 408, 410, to produce one or more cold neon display areas 112.

In summary, persons of ordinary skill in the art will readily appreciate that a camera with a cold neon display area and a method of manufacturing a camera with a cold neon display area have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A flash camera powered by a power source, comprising:
   a housing having a front portion having an interior surface and an exterior surface wherein at least a portion of the front portion is transparent;
   a flash assembly inside the housing, the flash assembly having a flash charging switch, a flash charging circuit, and a flash emitting device; and
   a light emitting and image generating assembly positioned inside interior surface of the housing, the light emitting and image generating assembly having a light emitting substrate layer at least a portion of which is made of phosphor, a color filter layer, a mask layer, and a conductive substrate layer, the light emitting substrate layer and the conductive layer electrically connected to the power source for excitation of the phosphor within the light emitting substrate layer, wherein the flash charging circuit excites and illuminates the light emitting substrate layer using power received from the power source in response to an activation of the flash charging switch.

2. A camera as defined in claim 1, wherein the color filter layer comprises a color silkscreen constructed to allow a predefined frequency band of light produced by the light emitting substrate layer to pass through the color filter layer.

3. A camera as defined in claim 1, wherein the mask layer blocks light produced by the light emitting and image generating assembly.

4. A camera as defined in claim 1, wherein the power source is structured to supply a voltage between 200V and 300V.

5. A camera as defined in claim 4, wherein the power source is structured to supply the voltage at a frequency between 5 kHz and 15 kHz.

6. A camera as defined in claim 1, further comprising a shutter switch, wherein the flash emitting device emits a flash and the light emitting and image generating assembly is turned off in response to an activation of the shutter switch.

7. A camera as defined in claim 1, further comprising:
   a capacitor electrically coupled to the flash assembly, wherein a charge held by the capacitor is discharged into the power source after a predetermined time period.

8. A camera as defined in claim 7, wherein the power source comprises a battery.

9. A camera as defined in claim 1, wherein the flash charging circuit illuminates the light emitting and image generating assembly for a predetermined time period.

10. A camera as defined in claim 1, wherein the flash charging circuit illuminates the light emitting and image generating assembly without emitting a pattern as if the pattern is being at least one of rotated, enlarged, contracted, moved forward, and moved backward.

11. A camera as defined in claim 1, wherein the flash charging circuit illuminates the light emitting and image generating assembly without human perceivable blinking of the light emitting and image generating assembly.

12. A camera as defined in claim 1, wherein the light emitting and image generating assembly is provided for generating an image of at least one of an alphabetic character, a number, a symbol, and/or a picture.

13. A method of constructing a flash camera having a power source, the method comprising:
   providing a camera housing, the camera housing including a first transparent portion located in a front surface of the camera housing;
   providing a first mask layer with a first opaque portion and a second transparent portion;
   providing a filter layer with a translucent colored portion;
   providing a transparent substrate layer;
   providing a light emitting substrate layer at least a portion of which is made of phosphor for emitting light upon excitation;
   assembling the flash camera by electrically connecting the light emitting substrate layer and the transparent substrate layer to power source leads for excitation of the light emitting substrate layer; and,
   assembling the flash camera by positioning the light emitting substrate layer, the transparent layer, the filter layer inside the front surface of the camera housing, and by substantially aligning the first transparent portion of the camera housing with the second transparent portion of the first mask layer and the translucent colored portion of the filter layer for generating an illuminated image through the first transparent portion of the camera housing from light generated by the light emitting substrate layer when powered by the power source.

14. A method as defined in claim 13, wherein providing the first mask layer with the opaque portion and the second transparent portion comprises silk screening the first mask layer.

15. A method as defined in claim 13, wherein providing the filter layer with the translucent colored portion comprises silk screening the filter layer.

16. A method as defined in claim 13, wherein providing the filter layer with the translucent colored portion comprises silk screening the filter layer with a first color and a second color.

17. A method as defined in claim 13, further comprising providing a second mask layer with a second opaque portion and a third transparent portion, wherein the first mask layer is positioned on an inside portion of the camera housing portion and the second mask layer is positioned on an outside portion of the camera housing portion.

18. A method as defined in claim 17, wherein the third transparent portion of the second mask layer is substantially aligned with the translucent colored portion of the filter layer.

* * * * *

UNITED STATES PATENT AND TRADEMARK OFFICE
CERTIFICATE OF CORRECTION

| | | |
|---|---|---|
| PATENT NO. | : 7,092,624 B2 | Page 1 of 1 |
| APPLICATION NO. | : 10/847076 | |
| DATED | : August 15, 2006 | |
| INVENTOR(S) | : Jerry W. Perry and Ivan Lau | |

It is certified that error appears in the above-identified patent and that said Letters Patent is hereby corrected as shown below:

Column 4, line 45, the word appearing as "front" should be -- from --

Column 4, line 60, the word appearing as "lighted" should be -- light --

Signed and Sealed this

Fourteenth Day of November, 2006

JON W. DUDAS
*Director of the United States Patent and Trademark Office*